: 2,905,647

2,905,647
PREPARATION OF OXETANE POLYMERS

Robert F. Goddu, Kennett Square, Pa., assignor to Hercules Powder Company, Wilmington, Del., a corporation of Delaware No Drawing. Application August 27, 1956
Serial No. 606,228

4 Claims. (Cl. 260—2)

This invention relates to an improved method for the preparation of polymers of 3,3-bis(chloromethyl)-oxetane, also known as 3,3-bis(chloromethyl)oxacyclobutane.

It is known that certain oxetanes, namely, 33-bis-(chloromethyl)oxetane may be polymerized to give high molecular weight polymers having a molecular weight of at least 10,000 and having physical properties which are highly desirable as applied to the broad field of use for such polymeric materials. However, heretofore, such oxetane has been polymerized using Friedel-Crafts catalysts, such as boron trifluoride etherate, aluminum chloride and others, at temperatures between —80° C. and 150° C. to obtain high molecular weight products. Under these conditions, it has been established and disclosed that the higher molecular weight products, suitable for plastics use, for example, were obtained only when the polymerization was carried out at room temperature or considerably below. Moreover, with use of the Friedel-Crafts catalysts, it has been established and disclosed that the amount of catalyst required is at a high level ranging between 0.1 and 10% and preferably above 1.0% by weight of the monomer. Needless to say, the requirement of such conditions has seriously detracted from the efficacy of the process and exploitation of its end products as well as imposing limitations in respect to versatility in end product application.

Now, in accordance with this invention, it was surprisingly discovered that high molecular weight polymers of 3,3-bis(chloromethyl)oxetane can be obtained with conversions of at least 40% at temperatures between 160 and 300° C. when using an amount of catalyst from ten to one thousand times smaller than theretofore required. Moreover, it was found that the polymers were of better quality with respect to color, stability and level of impurities than those theretofore obtained and that the polymerization process in addition to being more economical afforded improved versatility for handling the products involved.

More specifically, this invention provides a method for the polymerization of 3,3-bis(chloromethyl)oxetane to a polymer having a molecular weight of at least 10,000 by subjecting said oxetane to a temperature of at least 160° C. in the presence of aluminum chloride wherein the aluminum chloride is present in a small amount, that is, not more than about 1,000 p.p.m. by weight of the said oxetane and preferably not more than about 500 p.p.m.

The following examples will serve to illustrate the preparation of polymers from monomers of 3,3-bis-(chloromethyl)oxetane in accordance with this invention. All parts and percentages are by weight throughout the specification unless otherwise designated.

Example 1

A solution of 0.125 part $AlCl_3$ (Bakers Anhydrous) in 650 parts 3,3-bis(chloromethyl)oxetane was prepared by stirring the two at 50° C. under a blanket of nitrogen for 1.25 hours. This mixture was then added in increments over a period of 86 minutes to a vessel fitted with a stirrer and reflux condenser and blanketed with nitrogen. The vessel was immersed in an oil bath which was kept in the range of 191 to 205° C. The temperature of the stirred reaction mixture was at 178 to 184° C. during the time of this addition. However, at the end of the addition, the temperature was gradually raised to 205° C. over a period of 34 minutes.

The reaction mixture was a viscous liquid. It was poured into water. After it had cooled to room temperature, it was ground to pass 20 mesh. The excess monomer was steam distilled out of the product. From the weight of the recovered monomer and the polymer, it was determined that about 70% of the monomer had polymerized. The monomer-free polymer had a specific viscosity of 1.02 (1.0% solution in cyclohexanone at 50° C.).

Example 2

A similar experiment was made with a solution of 0.100 part $AlCl_3$ in 650 parts monomer. This was added to the reactor over a period of 107 minutes. The temperature of the bath was kept at 210–213° C.; the temperature in the reactor started at 187° C. and gradually rose to 200° C. in 50 minutes and stayed at 200–204° C. during the rest of the time of monomer addition. After all the monomer had been added, the bath temperature was raised to 230° C. to permit easier pouring of the viscous mass. The product was poured into cold water. Analysis showed that it contained about 12.0% monomer, that is, 88% conversion to polymer. The monomer-free polymer had a specific viscosity of 1.0 (1% solution in cyclohexanone at 50° C.).

Example 3

A solution of 0.150 part $AlCl_3$ in 650 parts 3,3-bis-(chloromethyl)oxetane monomer was stirred under a blanket of nitrogen. The vessel was immersed in an oil bath. The temperature of the bath was 170° C. at the start and was gradually raised to 207° C. In 40 minutes the reaction mixture showed some viscosity and the monomer was refluxing. For the next 95 minutes, the reaction mixture was at 201° C., the reflux temperature of the monomer. The reaction was stopped by pouring the viscous polymer solution into cold water. The product contained 30.5% monomer; that is, it had polymerized to the extent of 69.5%. It had a specific viscosity of 1.17 (1% solution in cyclohexanone at 50° C.)

With reference to the above examples, it will be seen that this invention provides a method of polymerizing 3,3-bis(chloromethyl)oxetane to a high molecular weight product at elevated temperatures and in the presence of a very small amount of catalyst. This, of course, was most unexpected. Although it is not intended that the invention shall be limited to any particular theory of operation, it appears well established that the catalysis involved in accordance with this invention is radically different from the conventional Friedel-Crafts catalysis which heretofore has been utilized for the preparation of polyoxetanes. For example, catalysis with Friedel-Crafts catalysts such as boron trifluoride or aluminum chloride leads to variations of molecular weight when temperature or concentration of catalyst is varied. That is, molecular weight decreases with increasing temperature and molecular weight decreases only gradually with increasing catalyst concentration. In contrast to the behavior of the conventional Friedel-Crafts catalysts, the catalyst and conditions according to this invention caused rapid increase of molecular weight at elevated temperatures in the presence of a relatively minute amount of catalyst, thereby indicating the functioning of a decidedly different catalyst mechanism.

The amount of catalyst to be utilized based by weight of the monomer may be varied from about 10 to about 1,000 p.p.m. With reference to the examples, it will be seen that the highest level of catalyst used was 231 p.p.m. Accordingly, the amount of catalyst preferred for production of high grade products and, particularly, for proucts to be utilized in association with electrical equipment is from about 30 to about 500 p.p.m.

The polymerization temperature in accordance with this invention may be varied between 160 and 300° C. However, it has been found that the preferred range is from about 170 to about 250° C. for general purpose utility including polymerizations in bulk or diluent systems as well as in situ polymerizations. The polymerization reaction may be carried out in either an open or closed vessel or the reaction may be carried out in atmospheric air where in situ polymerization is desired. The exclusion of excessive moisture is necessary but the presence of air may be tolerated. However, for the best ploymer properties and polymerization performance, anaerobic and anhydrous conditions are utilized. Under conditions where diluents of utility are those that do not react either with the monomer or the catalyst. Such diluents include hydrocarbons such as heptane, decane or dodecane and halogenated hydrocarbons such as carbon tetrachloride, tetrachloroethane and trifluoro-1,1,2-tribromoethane. The polymerization reaction time may be varied over a wide range. In accordance with this invention, polymerization reactions have been carried out using various times between a few minutes and several hours. No detrimental effects have been apparent under conditions where a prolonged reaction time is required or desired.

The high molecular weight polymers obtained in accordance with this invention may be separated from the polymerization reaction mass by standard procedures such as quenching the molten reaction mixture in a polymer nonsolvent such as methanol, water or carbon tetrachloride or the mass may be cooled, ground, and, if necessary, washed. The percent of conversion may be considerably varied in accordance with this invention with conversions as high as 98% having been obtained. Moreover, the polymers obtained had specific viscosities, at 50° C. of a 1% cyclohexanone solution of the polymer, of between 0.3 and 4.0 and even greater, thus showing that polymers having molecular weights in excess of 10,000 and much greater are obtainable. The desired specific viscosity of these polymers for general plastics use is in the order of 1.5–2.0 which is readily attainable by this invention.

From the foregoing, it is evident that there are numerous factors which will influence conditions for the most satisfactory operation of this invention, the actual requirements of which can be determined only by a detailed study of each set of starting materials and the intermediate and the finished products desired.

For example, although the invention has been particularly demonstrated for the preparation of 3,3-bis(chloromethyl)oxetane, the properties of the polymer may be modified by copolymerization with other 3,3-disubstituted oxetanes such as 3,3-bis(fluoromethyl)oxetane, 3,3-bis(bromomethyl)oxetane, 3-chloromethyl-3-methyloxetane, 3,3-dimethyloxetane, and 3,3-bis(phenoxymethyl)oxetane. Additionally, antioxidants, stabilizers, plasticizers and various other additives such as fillers, pigments, or other colorants may be incorporated with the polymers obtained in accordance with this invention. The specific materials utilized and their method of incorporation will, of course, depend on the intermediate and the finished products desired and, in general, additive incorporation may take place with the monomers, comonomers or preploymers as well as the end product polymers.

The advantages of this invention over processes heretofore known in the art are multifold. The invention opens the way to a cheaper and more flexible process for preparing polymers of 3,3-bis(chloromethyl)oxetane having molecular weights in excess of 10,000. Expensive refrigeration equipment for low temperature polymerization to obtain the high molecular weight polymers is eliminated. In accordance with prior art procedures, bulk polymerizations were not feasible for lack of consistent control, whereas with this invention bulk polymerizations are entirely satisfactory. Furthermore, with the use of lower catalyst concentrations by a factor approaching trace amounts, the necessity for aftertreatment of the finished polymer to remove impurities is reduced to a minimum and for some end product applications may be eliminated entirely. Still further, the invention permits considerable flexibility in choosing operating conditions to get the most desirable polymer properties, to control the rate of the reaction, and to get the most economical operating conditions. Continuous polymerizations in extruders and of films on heated plates and belts have been attained. These procedures were impossible according to the processes heretofore known. Furthermore, the polymer obtained in accordance with this invention has better color, that is, it is whiter, than polymer heretofore obtained by the prior art processes.

Additionally, the advantages of the invention in respect to flexibility is readily appreciated in considering its applicability as compared to the processes heretofore known. For example, polymerization in situ is now possible thereby opening a new field of application for these polymers. For such uses, the monomer-catalyst mixture may be prepared at room temperature. In coating wire, metal and other high temperature-resistant objects, the object to be coated is heated to a temperature in the order of 250° C., passed through a bath of the monomer-catalyst mixture and is removed therefrom with a thin film of polymer on the surface. In coating paper, fabric and other low temperature-resistant objects, the object is preferably coated with the monomer-catalyst mixture and then subjected to elevated temperature in a heat zone to complete polymerization. In preparing laminates, the materials are coated with the monomer-catalyst mixture, pressed and subjected to elevated temperature to complete polymerization. In potting compound applications, the monomer-catalyst mixture is poured into a mold and then subjected to elevated temperature to complete polymerization. While the foregoing exemplifies some of the applications where in situ polymerization may be employed with advantage, it is not intended to be all inclusive but rather to emphasize some of the advantages over the solvent or dispersion coating systems and other conventional techniques heretofore available for these polymers.

Furthefore, the polymers produced in accordance with this invention are suitable for the various conventional thermoplastic uses such as molding to form various shaped articles; extrusion to form articles such as film, filaments, sheeting, strip and tubing; calendering to form film, sheeting and coating of paper or fabric; and laminating to form countertops, industrial board and the like.

It will be seen, therefore, that this invention may be carried out by the use of various modifications and changes without departing from its spirit and scope.

What I claim and desire to protect by Letters Patent is:

1. In the method of polymerizing 3,3-bis(chloromethyl)oxetane to a polymer having a molecular weight of at least 10,000, the improvement which consists essentially in combination subjecting 3,3-bis(chloromethyl) oxetane to a temperature of between 160 and 300° C. ence of aluminum chloride, said aluminum chloride being present in an amount of not more than about 500 p.p.m. by weight of said oxetane.

2. In the method of polymerizing 3,3-bis(chloromethyl)oxetane to a polymer having a molecular weight of at least 10,000, the improvement which consists essentially in combination subjecting 3,3-bis(chloromethyl)oxetane to a temperature of between 160 and 300° C. in the presence of aluminum chloride, said aluminum chloride being present in an amount of from about 10 to about 500 p.p.m. by weight of said oxetane.

3. In the method of polymerizing 3,3-bis(chloromethyl)oxetane to a polymer having a molecular weight of at least 10,000, the improvement which consists essentially in combination subjecting 3,3-bis(chloromethyl)-oxetane to a temperature of from about 170 to about 250° C. in the presence of aluminum chloride, said aluminum chloride being present in an amount of from about 10 to about 500 p.p.m. by weight of said oxetane.

4. In the method of polymerizing 3,3-bis(chloromethyl)oxetane to a polymer having a molecular weight of at least 10,000, the improvement which consists essentially in combination subjecting 3,3-bis(chloromethyl)oxetane to a temperature of from about 170 to about 250° C. in the presence of aluminum chloride, said aluminum chloride being present in an amount of from about 30 to about 500 p.p.m. by weight of said oxetane.

References Cited in the file of this patent

Farthing et al.: Jour. Polymer Science, vol. 12, pages 503–7 (1954).

UNITED STATES PATENT OFFICE
CERTIFICATE OF CORRECTION

Patent No. 2,905,647 September 22, 1959

Robert F. Goddu

It is hereby certified that error appears in the printed specification of the above numbered patent requiring correction and that the said Letters Patent should read as corrected below.

Column 1, line 19, for "33-bis" read -- 3,3-bis --; line 49, for "theretofore" read -- heretofore --; column 3, line 9, for "proucts" read -- products --; line 22, for "ploymer" read -- polymer --; line 24, after "where" insert -- diluent polymerization reactions are desired, the --; column 4, line 71, strike out "between 160 and 300° C." and insert instead -- at least 160° C. in the pres- --.

Signed and sealed this 8th day of March 1960.

(SEAL)

Attest:

KARL H. AXLINE
Attesting Officer

ROBERT C. WATSON
Commissioner of Patents